Nov. 29, 1932.  H. H. VALPEY  1,889,186
CLUTCH CONTROL
Filed May 21, 1931  2 Sheets-Sheet 1
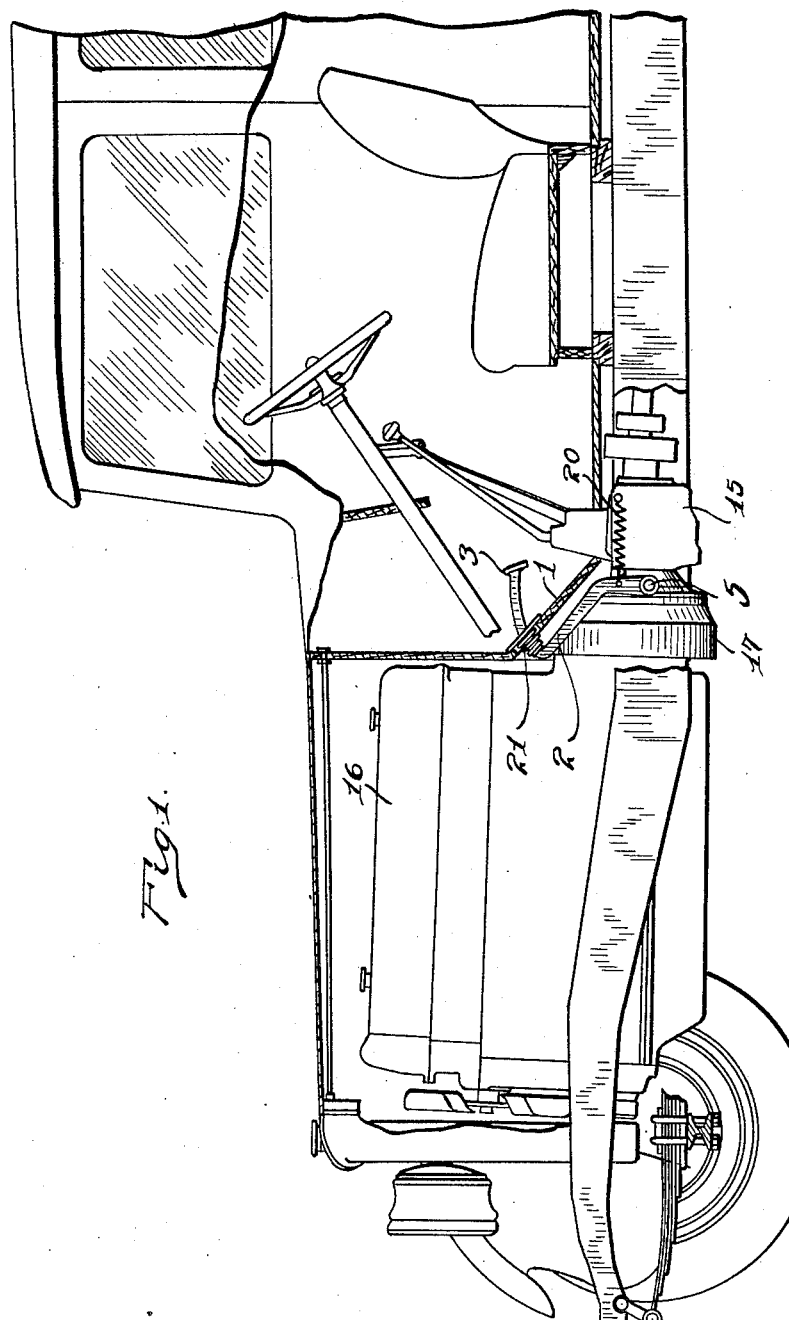
INVENTOR.
HENRY H VALPEY.
BY
Barnes and Kisselle
ATTORNEYS.

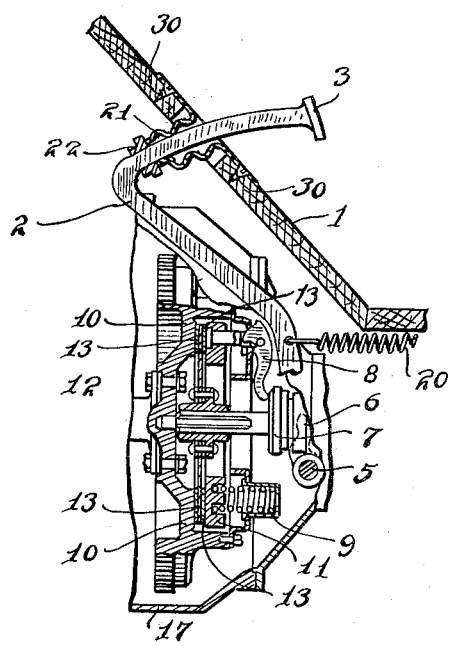
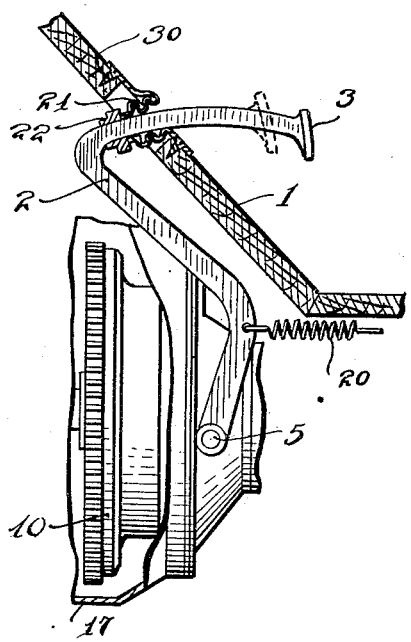
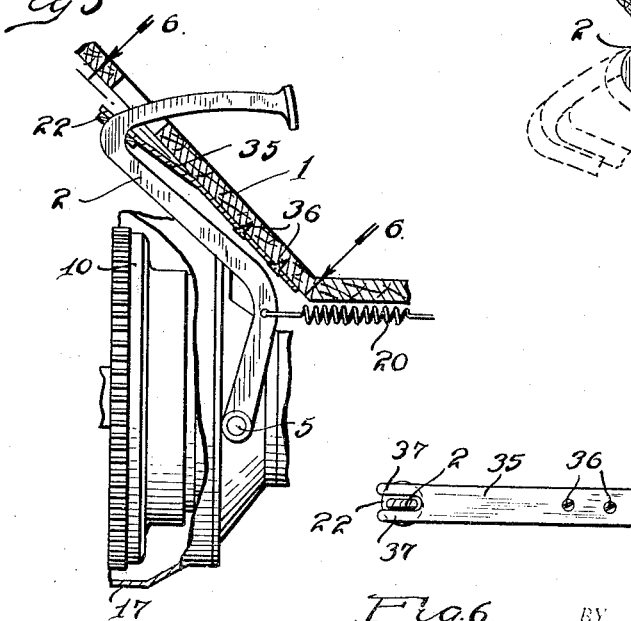

Patented Nov. 29, 1932

1,889,186

UNITED STATES PATENT OFFICE

HENRY H. VALPEY, OF DEARBORN, MICHIGAN, ASSIGNOR TO LONG MANUFACTURING COMPANY, OF DETROIT, MICHIGAN, A CORPORATION OF MICHIGAN

CLUTCH CONTROL

Application filed May 21, 1931. Serial No. 539,014.

This invention has to do with clutch operation in automotive vehicles. The usual clutch in an automotive vehicle is at present almost universally operated by a lever controlled by the foot which extends through the floor or toe boards of the car. The clutch is disengaged when the lever is depressed and engaged by its packing springs when the lever is released. In this releasing of the lever it retracts toward the floor of the car. Automotive vehicle clutches usually employ friction material which may be fibrous, which is packed between opposing clutch members. As the friction material wears in use it becomes thinner and the clutch opposing members which engage the friction material must necessarily move closer together. It follows that as the clutch facings wear the position of the lever, in full clutch engagement, approaches the floor of the car. Ultimately, on considerable wear of the clutch facing, the control lever will strike the floor of the car or toe boards and prevent complete clutch engagement. This results in slippage of the clutch and is often not corrected until the clutch facings have been so damaged that replacement is necessary.

The present invention is directed toward the provision of an arrangement designed to prevent damaging of the clutch for this reason. In accordance with the invention, a suitable device is provided against which the lever normally stops and rests, but this stop is arranged to give way to the pressure of the clutch packing springs in such manner that the clutch packing springs force the lever to an abnormal position. The abnormality of the position increases as the clutch facing wears, and the abnormality is preferably such as to challenge the attention of the user to have an adjustment made before the clutch is damaged. The invention will be better appreciated and its objects more readily understood after the following detailed description has been considered in connection with the accompanying drawings:

Fig. 1 is a view partly in section and with parts cut away illustrating the arrangement mounted on an automobile.

Fig. 2 is an enlarged cross sectional view showing a clutch lever and its stop member, illustrating also a clutch mechanism.

Fig. 3 is a view illustrating the operation of the stop member.

Fig. 4 is a view depicting a more or less conventional arrangement of clutch lever mounting.

Fig. 5 is a view illustrating a modified form of the invention.

Fig. 6 is a view showing the stop member in plan looking substantially in the direction of the arrows of Fig. 5.

The floor and automobile usually comprises angularly disposed toe boards 1, and a clutch releasing lever 2 extends therethrough and is provided with a pedal 3. This clutch lever is mounted upon rock shaft 5 which, as shown in Fig. 2, has an arm 6 for urging forwardly, or from right to left, a thrust member or thrust bearing 7. This rocks levers 8 on the clutch to release clutch engagement effected by packing springs, one of which is shown at 9. The clutch driving members 10 and 11 are packed together by the springs 9 with the driven member 12 between them and provided with clutch facing material 13. Other parts of an automotive vehicle are illustrated in Fig. 1 in order to show the environment of the invention but which have no special cooperation with the invention, such parts including a transmission housing 15, engine 16, clutch housing 17.

A conventional arrangement of clutch lever is illustrated in Fig. 4 wherein the lever is shown in released position with the clutch engaged. Ordinarily about a six inch movement is permitted for the pedal 3. The clutch lever is held rearwardly as by means of a spring 20 and it is stopped by a stop member 21 (Fig. 2). In an initial set-up it is preferable that some back-lash be provided in the clutch pedal; in other words, as the pedal is depressed there is a waste movement from position $a$ of Fig. 4 to position $b$. At position $b$ clutch disengagement begins, and from position $b$ to position $c$ the clutch becomes disengaged with final disengagement effective at position $c$. For commercial clearance purposes further movement of the lever is provided, as for example, to position *d*. This is merely an excess movement and may be used entirely by some operators, or partially by others.

Heretofore in a clutch lever installation the spring 20 held the lever against the toe boards in position *a*. As the clutch facings wear in use position *b* gradually moves towards position *a* until finally the lever cannot move back far enough to permit complete clutch engagement. It is at this time that the effective packing pressure of the clutch springs is reduced by forcing the lever against the toe boards with the result that the clutch begins to slip. The ordinary operator has nothing to challenge his attention to this because his clutch lever is still in the same position as determined by the toe boards, namely, position *a*. As a consequence thereof the vehicle is operated with a slipping clutch and ofttimes the difficulty is not discovered until the clutch facings are damaged to such an extent that a complete replacement is necessary. This, in actual experience, has been found to be the source of most of the trouble in clutches.

However, with the present invention the lever in position *a* is stopped by a movable or compressible stop member. This stop member, as shown in Figs. 2, 3 and 4 may be made of rubber and the walls thereof may be corrugated as shown to provide a collapsible structure similar to a bellows. To bring out the operation let it be assumed that the clutch pressure springs require a force of about twenty-five pounds for release; that the spring 20 retracts the lever against the stop 21 with a pressure of, say two or three pounds; the stop 21 will collapse only upon a pressure in excess of the strength of the spring 20, say for example, five or six pounds. These figures are only given for exemplary purposes.

In the initial installation the spring 20 brings the lever back against the stop 21 for the purpose of which the lever may be provided with a collar 22, and the stop 21 positions the clutch pedal as it will not collapse by the pressure exerted upon it due to spring 20. In this initial position the clutch pedal assumes its normal position substantially in alignment with the usual brake pedal. This is position *a*. However, in continued use and wear of the clutch facings position *b* moves back toward position *a*, and when it arrives and passes position *a*, the stop 21 is compressed. Inasmuch as it takes only five or six pounds, for example, to compress the stop 21, and inasmuch as this is only a small portion of the twenty-five pounds exerted by the packing springs, the packing springs cause collapse of the stop 21. Thus, although some of the force of the packing springs is expended in collapsing stop 21 yet sufficient packing pressure is left to pack the clutch so that it will not slip thus preventing damage to it. Upon continued operation the stop member 21 is compressed more and more as the clutch facings wear until, as shown in Fig. 3, the clutch pedal assumes an abnormal position. In other words, the clutch pedal keeps creeping backwardly toward the operator and becomes out of general alignment with the brake pedal. The member 21 may be arranged to permit of in the neighborhood of 2 inches of this backward retracting movement of the pedal. This abnormal position of the clutch pedal challenges the attention of the operator that something is wrong. It becomes more difficult to place the foot over the pedal as the foot must be raised higher. In present day automobiles the position and relation of the parts are figured out to a nicety, and when an operator is positioned on the driver's seat with the steering wheel before him and the shift and brake levers beside him, he will find it difficult to operate the clutch lever when moved back to this abnormal position by collapse of the stop member 21. This will challenge his attention that something needs adjustment to the end that the vehicle will be serviced and the clutch lever readjusted before the clutch facings have been damaged.

In short, a stop for the clutch lever is provided which will give way upon wear of the clutch facings as distinguished from the stop which is rigid and which holds the clutch lever in a predetermined position regardless of whether or not the clutch is fully engaged. Thus, the device of this invention not only in itself prevents damage to the clutch by slipping, but serves as a warning to the operator to the end that an adjustment will be made before the clutch has been damaged.

The member 21, as above pointed out, may be a single piece of molded rubber with corrugated walls arranged to collapse after the fashion of a bellows, and it may be merely secured to the floor boards by screws 30 for the purpose of which it may be provided with a rim 21. Also this member 21 may serve as a seal for the opening as the end 22 may relatively snugly fit around the lever arm. It is within the invention to make this stop in varied forms. One modified form is shown in Fig. 5 wherein the stop comprises a leaf spring 35 secured to the toe boards as at 36. This spring 35 may be bifurcated as shown in Fig. 6 with the bifurcated ends 37 passing on opposite sides of the lever 2, and the lever 2 may be equipped with a collar 22 as in the form shown in Figs. 2 to 4. In this form the spring 20, which retracts the lever, is not sufficiently strong to collapse the spring stop, while the spring stop readily collapses when subjected to the greater pressure of the packing springs.

Claims:

1. In an automotive vehicle, the combination of a clutch having packing springs, a lever movable to compress the packing springs for clutch release, and a flexible stop for the lever against which the lever abuts in clutch engaged position, said flexible stop being sufficiently rigid to position the lever under normal conditions but flexing to permit shifting of lever position by power exerted thereon by the clutch packing springs.

2. In an automotive vehicle, the combination of a clutch having packing springs, a lever movable to compress the packing springs for clutch release, and a relatively weak stop for the lever against which the lever abuts in clutch engaged position, said stop serving to hold the lever substantially in a given position in normal conditions but capable of being moved by power of the clutch packing springs exerted thereon through the lever upon wear of clutch facing material.

3. In an automotive vehicle the combination of a clutch, an operating lever extending through the floor of the vehicle and provided with a pedal, said pedal being depressible toward the floor for clutch release and retractable away from the floor for clutch engagement, a relatively weak stop for stopping the retracting movement of the lever in normal conditions, said relatively weak stop being movable by power exerted thereon by the clutch packing springs when clutch facing material wears.

4. In an automotive vehicle the combination of a clutch, a lever therefor extending through the floor of the vehicle, and a flexible stop for the lever preventing said lever from contacting with the floor, said stop being sufficiently flexible to be compressed by the clutch packing springs.

5. The combination with the floor of an automotive vehicle, a clutch lever extending through the floor and shiftable relative thereto, and a flexible stop for the lever to prevent the same from contacting with the floor under normal conditions.

6. The combination with the floor of an automotive vehicle, a clutch lever extending through the floor and shiftable relative thereto, and a rubber stop for the lever to prevent the same from contacting with the floor under normal conditions, said stop being relatively weak as compared to the clutch springs whereby it may be compressed thereby.

7. The combination with the floor of an automotive vehicle, a clutch lever extending through the floor and shiftable relative thereto, and a hollow bellows like stop for the lever serving to keep the lever out of contact with the floor under normal conditions, said stop being relatively weak as compared to the clutch springs whereby it may be compressed thereby.

8. As a new article of manufacture, a stop device for a clutch lever or the like, comprising a hollow bellows like rubber body through which a portion of the lever is adapted to reciprocate.

9. As a new article of manufacture, a stop device for a clutch lever or the like, comprising a hollow bellows like rubber body through which a portion of the lever is adapted to reciprocate, and a flange on said rubber body adapted to be attached to a supporting structure.

10. The combination with the floor of an automotive vehicle, a clutch having packing springs, a control lever therefor, said floor having an aperture therein through which a portion of the lever extends, the end of the lever having a pedal, said pedal being depressible toward the floor for clutch release and retractable away from the floor for clutch engagement, a spring for retracting the lever, and a flexible stop for positioning the lever in retracted position and holding it out of contact with the floor, said stop having sufficient strength to resist substantial flexure by the power exerted by the retracting spring, which resistance to flexure is less than the power which may be exerted thereon by the clutch packing springs whereby the clutch packing springs may flex said stop.

In testimony whereof I affix my signature.
HENRY H. VALPEY.